United States Patent [19]

Speier

[11] Patent Number: 5,228,712
[45] Date of Patent: Jul. 20, 1993

[54] COLLAPSIBLE MOTORCYCLE TRAILER

[76] Inventor: Guenter O. Speier, 22912 Cordoba Ct., Salinas, Calif. 93908

[21] Appl. No.: 798,708

[22] Filed: Nov. 26, 1991

[51] Int. Cl.[5] ............................................. B62D 53/04
[52] U.S. Cl. ................................. 280/401; 280/402; 280/639; 414/485; 414/537
[58] Field of Search ............... 200/292, 400, 401, 402, 200/460.1, 504, 511, 639; 414/563, 537, 482, 483, 485

[56] References Cited

U.S. PATENT DOCUMENTS

| | | | |
|---|---|---|---|
| 2,125,479 | 8/1938 | Zagelmeyer | 280/511 |
| 3,822,798 | 7/1974 | Neff | 280/400 X |
| 3,997,186 | 12/1976 | Pottorff | 280/494 X |
| 4,078,821 | 3/1978 | Kitterman | 280/401 X |
| 4,362,316 | 12/1982 | Wright | 280/639 X |
| 4,763,914 | 8/1988 | Lemmons | 280/401 |

FOREIGN PATENT DOCUMENTS 904744 2/1954 Fed. Rep. of Germany ...... 280/402

*Primary Examiner*—Margaret A. Focarino
*Assistant Examiner*—Victor E. Johnson
*Attorney, Agent, or Firm*—Townsend and Townsend

[57] ABSTRACT

A fully collapsible ramp trailer is disclosed which is provided with an adjustable axle for balancing the weight of a vehicle-towed motorcycle for optimum transport. In the assembled disposition, the ramp unfolds into three rigidly coupled sections with a hinged rear ramp. The forward section of the ramp trailer includes a fount wheel capturing well for receiving the front wheel of a motorcycle. The middle section of the ramp in the assembled disposition rigidly braces relative to the capturing wheel well portion at one end and rigidly braces to the axle section of the ramp at the other end to form a unitary and rigid bed upon which the motorcycle can be rolled for loading and unloading. The rear ramp hinges with respect to the three section ridged frame and moves from a ground engaged ramp position to an upwardly folded abutted position to the rear wheel of a loaded motorcycle. In the lowered position, the rear ramp is provided with a tire gripping surface which enables the motorcycle to be driven onto the trailer under its own power during loading and braked in rolling off of the trailer during unloading. In the raised position, the rear ramp serves as a stabilizing upper tie down at the rear wheel of the motorcycle.

8 Claims, 5 Drawing Sheets

COLLAPSIBLE MOTORCYCLE TRAILER

This invention relates to a collapsible motorcycle trailer. More specifically, a collapsible motorcycle trailer is shown which is capable of collapsing to a small unit for storage within a garage and yet expands to a convenient cycle transport vehicle for roll on and roll off transport of motorcycles having varying weights with corresponding varying centers of gravity of the towed motorcycle load.

BACKGROUND OF THE INVENTION

Collapsible motorcycle trailers are known.

Lemmons U.S. Pat. No. 4,763,914, issued Aug. 16, 1988 is an example of such a collapsible trailer. In this disclosure, a transporting ramp folds in one half for the collapsed disposition of the trailer. This folding ramp, when loaded with a motorcycle preferably loads from the middle of the ramp with the rear wheel of the motorcycle backing onto the ramp followed by the front wheel.

Portoff U.S. Pat. No. 3,997,186 issued Dec. 14, 1976 illustrates and articulating frame with wheels, this frame being bolted to the frame of the motorcycle to enable transport.

Holland U.S. Pat. No. 2,988,382 issued Oct. 28, 1959 illustrates a single folded ramp with a single underlying wheel. Lioscomb Jr. et al. U.S. Pat. No. 3,979,137 issued Sep. 7, 1976 and Kallenbach U.S. Pat. No. 3,778,087 issued Dec. 11, 1953 disclose respective trailers where the respective front and rear wheels of the towed motorcycle are used for transport. These arrangements are typical of numerous other references.

Collapsible trailers of the prior art are especially sized with respect to the motorcycles they tow. Points for the fastening of the motorcycles to the collapsible trailers require generally that the trailer be dimensioned to fit the motorcycle. More over, most collapsible trailers do not include convenient roll on and roll off loading features. Further, braced support of the relatively high center of gravity towed motorcycle load is not considered.

SUMMARY OF THE INVENTION

A fully collapsible ramp trailer is disclosed which is provided with an adjustable axle for balancing the weight of a vehicle-towed motorcycle for optimum transport. In the assembled disposition, the ramp unfolds into three rigidly coupled sections with a hinged rear ramp. The forward section of the ramp trailer includes a fount wheel capturing well for receiving the front wheel of a motorcycle. The middle section of the ramp in the assembled disposition rigidly braces relative to the capturing wheel well at one end and rigidly braces to the axle section of the ramp at the other end to form a unitary and rigid bed upon which the motorcycle can be rolled for loading and unloading. The rear ramp hinges with respect to the three section ridged frame and moves from a ground engaged ramp position to an upwardly folded abutted position to the rear wheel of a loaded motorcycle. In the lowered position, the rear ramp is provided with a tire gripping surface which enables the motorcycle to be driven onto the trailer under its own power during loading and braked in rolling off of the trailer during unloading. In the raised position, the rear ramp serves as a stabilizing upper tie down at the rear wheel of the motorcycle. Paired spaced apart towing wheels are provided on either side of the axle ramp section. Wheels are eccentrically mounted to the axle and mount to the axle ramp at varying degrees of rotation to enable change of the wheels' disposition with respect to the trailer. This change of disposition of the wheels enables the wheels to be shifted up and down as well as forward and rearward relative to the loaded motorcycle to obtain balance of the towed loaded motorcycle. Folding of the trailer occurs with the ramp folding over one side of the axle section of the ramp, the forward ramp and wheel well folding over the opposite side of the axle section of the ramp. In the folded disposition, the trailer has the ability to stand on the folded ramps in a cross section that does not substantially exceed that of the wheels and axles alone.

BRIEF DESCRIPTION OF THE DRAWINGS

FIGS. 2A–2D are a cartoon series illustrating the collapse of the motorcycle trailer with:

FIG. 2A illustrating the trailer in the just unloaded disposition with the loading ramp down;

FIG. 2B illustrating the trailer with the ramp section of the trailer collapsed over the axle section of the ramp;

FIG. 2C illustrating the trailer with the axle section of the ramp being hinged with respect to the forward ramp section;

FIG. 2D illustrating the forward ramp section folded under the axle ramp portion;

DESCRIPTION OF THE PREFERRED EMBODIMENT

Figure 1:
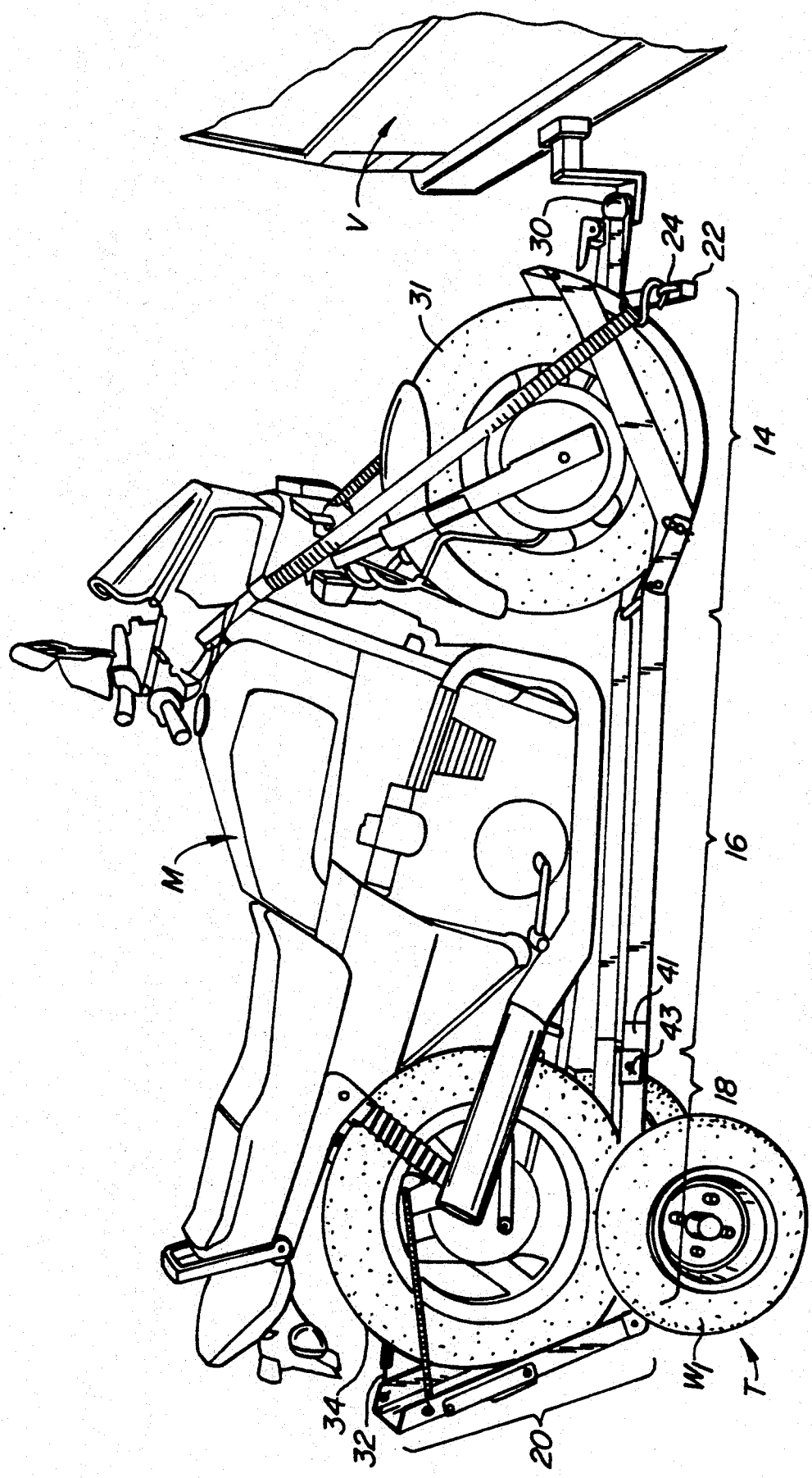
FIG. 1 is a perspective view of the motorcycle trailer of this invention with a motorcycle loaded for rolling transport to a towing vehicle.

Referring FIG. 1, the ramp motorcycle trailer T of this invention is illustrated towed from a vehicle V. The wheel well section 14 forms the first part of a ridged ramp; the middle ramp section 16 forms the middle part of a ridged ramp; and the axle section 18 forms the rear part of the ridged ramp. When trailer T is expanded for loading a motorcycle M, ramp sections 14, 16 and 18 connect to form a single, vertical ridged member.

Paired spaced apart wheels $W_1$ and $W_2$ enable towing of the motorcycle in the upright position. A trailer hitch 30 on wheel well portion 14 connects to vehicle V to complete the tow.

It will be observed that ramp 20 is raised and forms a stabilizing tie off 32 to the rear wheel 34 of motorcycle M. This tie off serves to maintain the motorcycle M in the vertical position. Tie straps can be used from this ramp to stabilize the rear wheel.

Similarly, tie straps are used from the vicinity of the rear axle channel 40 for securing of the trailer.

A forwardly mounted cross bar 22 mounts to wheel well member 14 and defines two spaced apart tie off points 24 from which straps can mount the towed motorcycle above the front wheel 31 to hold motorcycle M in the upright disposition on trailer T.

Referring to the cartoon series of FIGS. 2A-2D, the understanding of the collapsing of the ramp type trailer can be set forth.

Figure 2A:
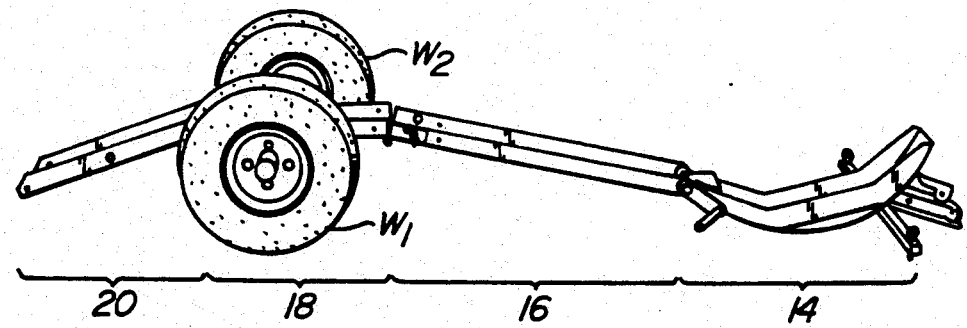

Referring to FIG. 2A, motorcycle M has been off loaded by first releasing of the respective ties. Thereafter, ramp 20 has been lowered to the ground to form from the central and ridged ramp of the motorcycle trailer a roll on, roll off ramp. Finally—and not shown—the motorcycle is backed off the trailer utilizing the brakes on the vehicle. Thereafter, the light weight trailer is easily disconnected from the trailer hitch and disposed as shown in FIG. 2A-2D.

It will be understood that in loading the motorcycle M to the trailer T, the process is reversed. Specifically, with the engine still running, the motorcycle M can be driven onto ramp 20 with the front wheel being received within wheel well 14. To provide sufficient traction, ramp 20 is provided with a high friction surface.

Figure 2B:
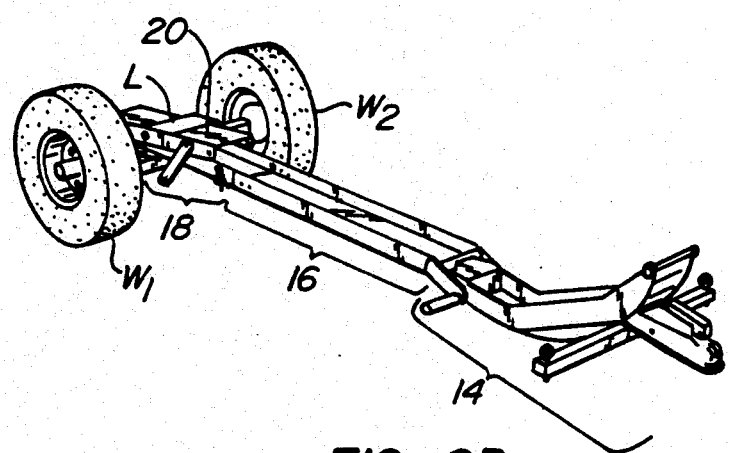

Referring to FIG. 2B, ramp 20 has been folded forwardly over axle ramp portion 18 so as to confront the top of the ramp.

Figure 2C:
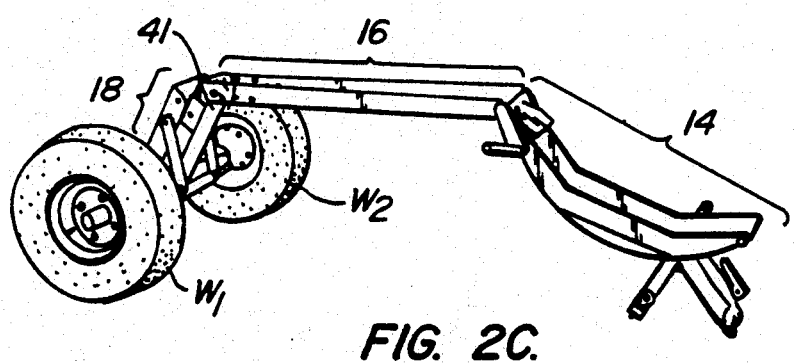

Referring to FIG. 2C, hinge 41 at abutting bar members 42 has been released at pins 43 (See FIG. 11) and breaks front ramp 16 and axle ramp 18. Folding of trailer T occurs with axle ramp 18 folding over with rear ramp 20 still confronted until front ramp 16 confronts the bottom of axle ramp 18 as shown in FIG. 2D.

Figure 2D:
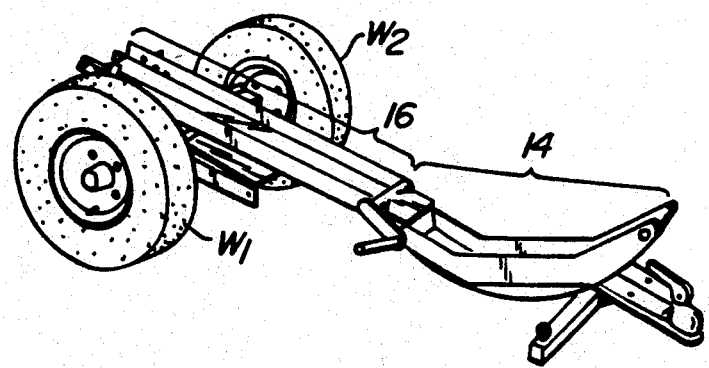
Figure 3:
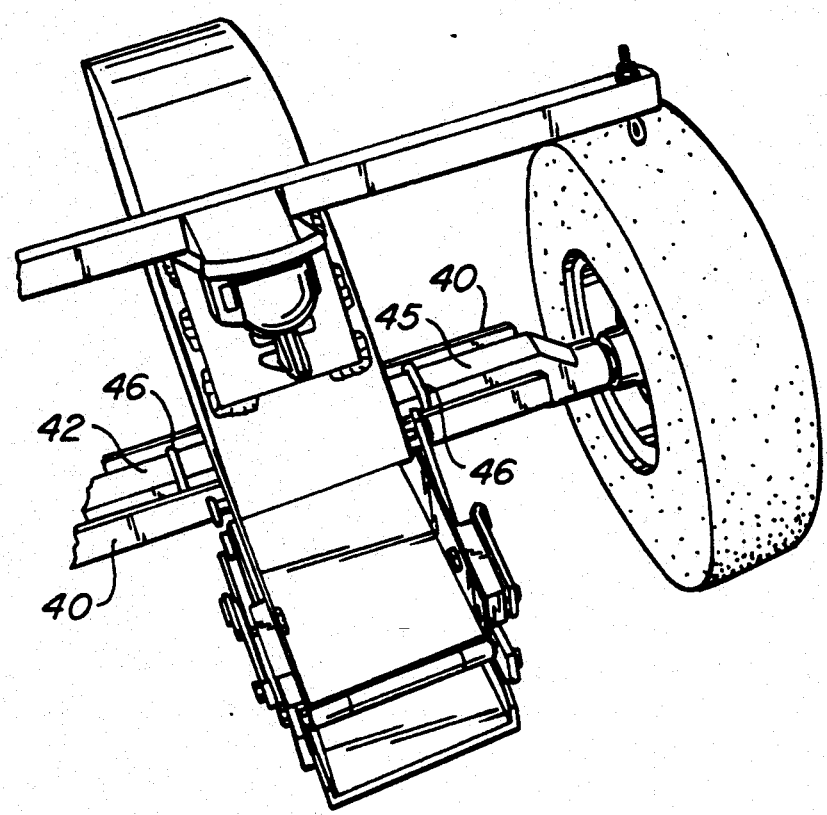
FIG. 3 illustrates the trailer in the collapsed position and also displays the eccentric axle mount for the adjustment of load height as well as shifting of the loaded motorcycle forward and rearward relative to the axle loading of the wheels; and, FIG. 4 illustrates apparatus for the tandem tow of two trailers side-by-side.

Finally and referring to FIG. 2D, wheel well 14 folds over and confronts front ramp 16 as shown in FIG. 2D to complete collapse of the trailer. It will be observed that trailer T can be tilted backwards on the ends of the folded ramps to stand upwardly on the ramps in relatively narrow confines such as the bed of a small truck or trunk of a car (for transport) or placed within the corner of a garage or even a closet (for storage).

There is provided an adjustability of the loaded motorcycle M on trailer T. Specifically, axle 45 is square sectioned and has eccentrically mounted wheels $W_1$ and $W_2$. The axle is held to the underside of axle ramp 18 at U-sectioned channel 40 by U-bolts 46. It will be understood that by loosening U-bolts 46 and rotating axle 45 in quarter turns, the respective wheels $W_1$ and $W_2$ can be moved. Displacement of wheels forwardly of the trailer, or rearward of the trailer can occur. Further, displacement of the wheels up and down can likewise occur.

Figure 4:
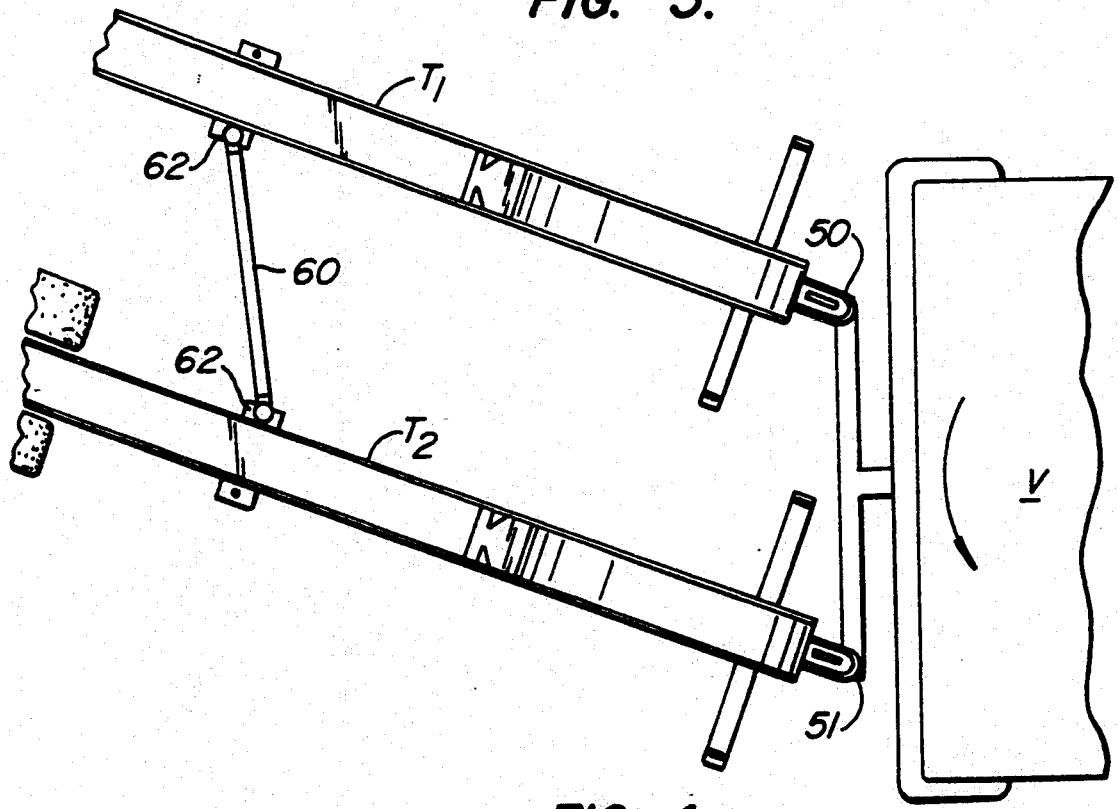

Finally, and referring to FIG. 4, a top plan view of two trailers towed side-by-side from the same vehicle is shown. A towing vehicle having paired towing points 50, 51 is shown towing trailers $T_1$, $T_2$. A spacer bar 60 pivoting at each end 62 on one of the trailers enables the spaced trailers to be towed and otherwise maneuvered in tandem.

The trailer T is light when empty. I prefer to collapse trailer T and haul the trailer in a vehicle when unloaded.

Figure 5:
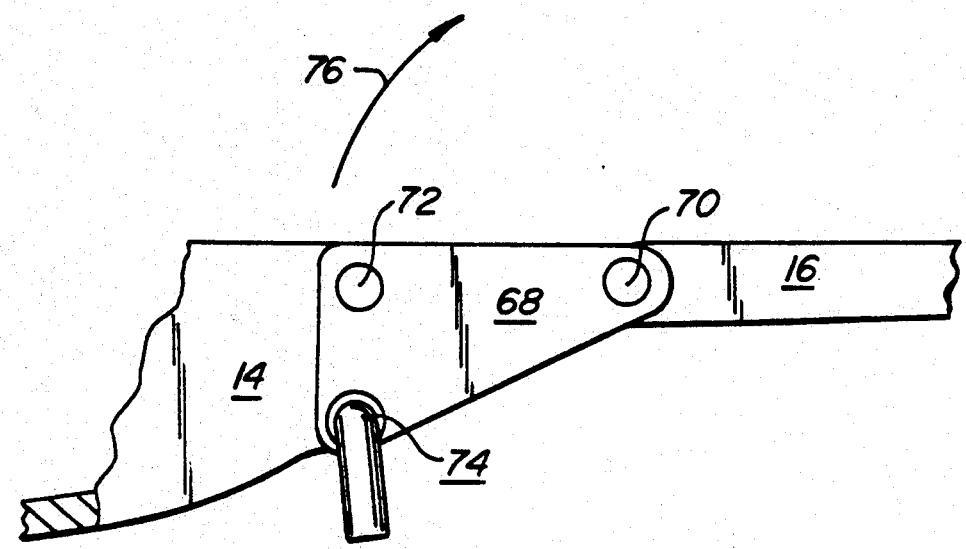
FIG. 5 illustrates a perspective view of the wheel well attachment at the ramp.

Referring to FIG. 5, wheel well section 14 is shown connected to middle ramp section 16. A rigid connection between the middle ramp section 16 and plate 68 is formed at pins 70, 72. When removable pin 74 is removed, pivot of wheel well section occurs overlying middle ramp section 16.

Figure 6:
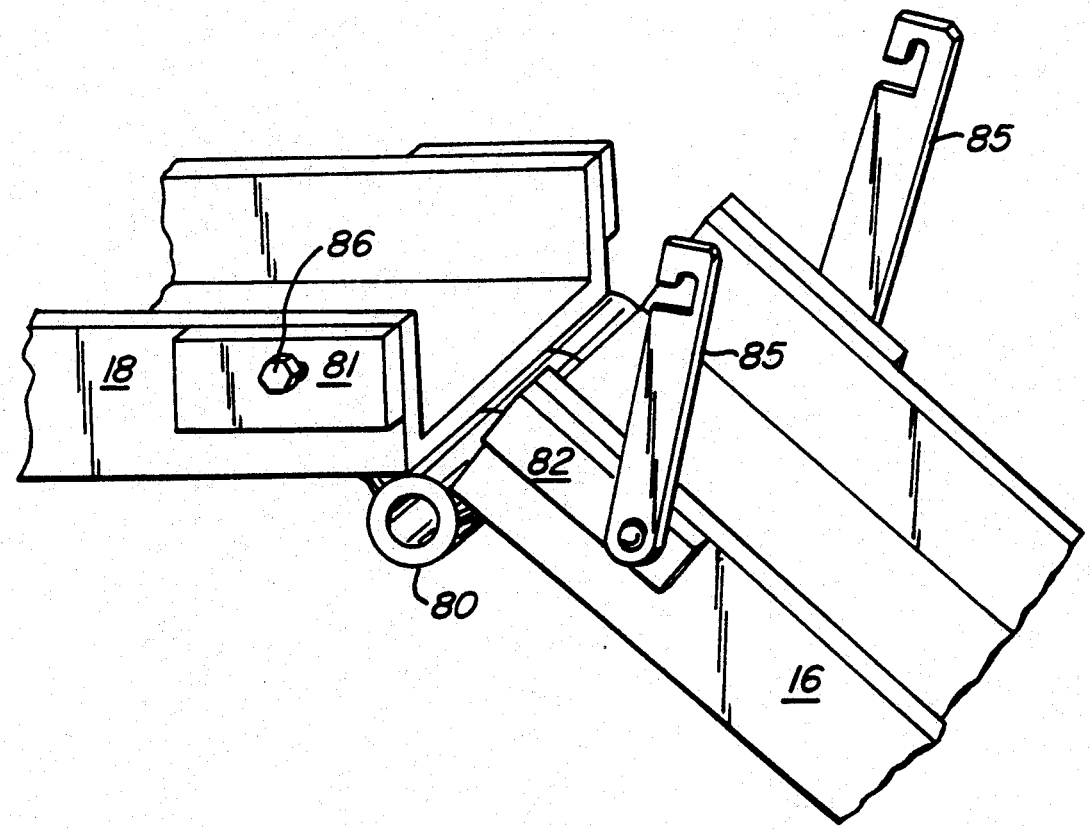
FIG. 6 illustrates a perspective view of a typical detail of the ramp.

Referring to FIG. 6, hinge 40 can be seen joining axle ramp section 18 to middle ramp section 16. The abutment produced across this hinge is reinforced by opposing plates 81, 82. When the respective ramp sections are in place, they are held by hinged bars 85 fixing to bolts 86. As a result of the structure of FIGS. 5 and 6, the trailer when assembled remains rigidly linear for the desired transport.

Figure 7:
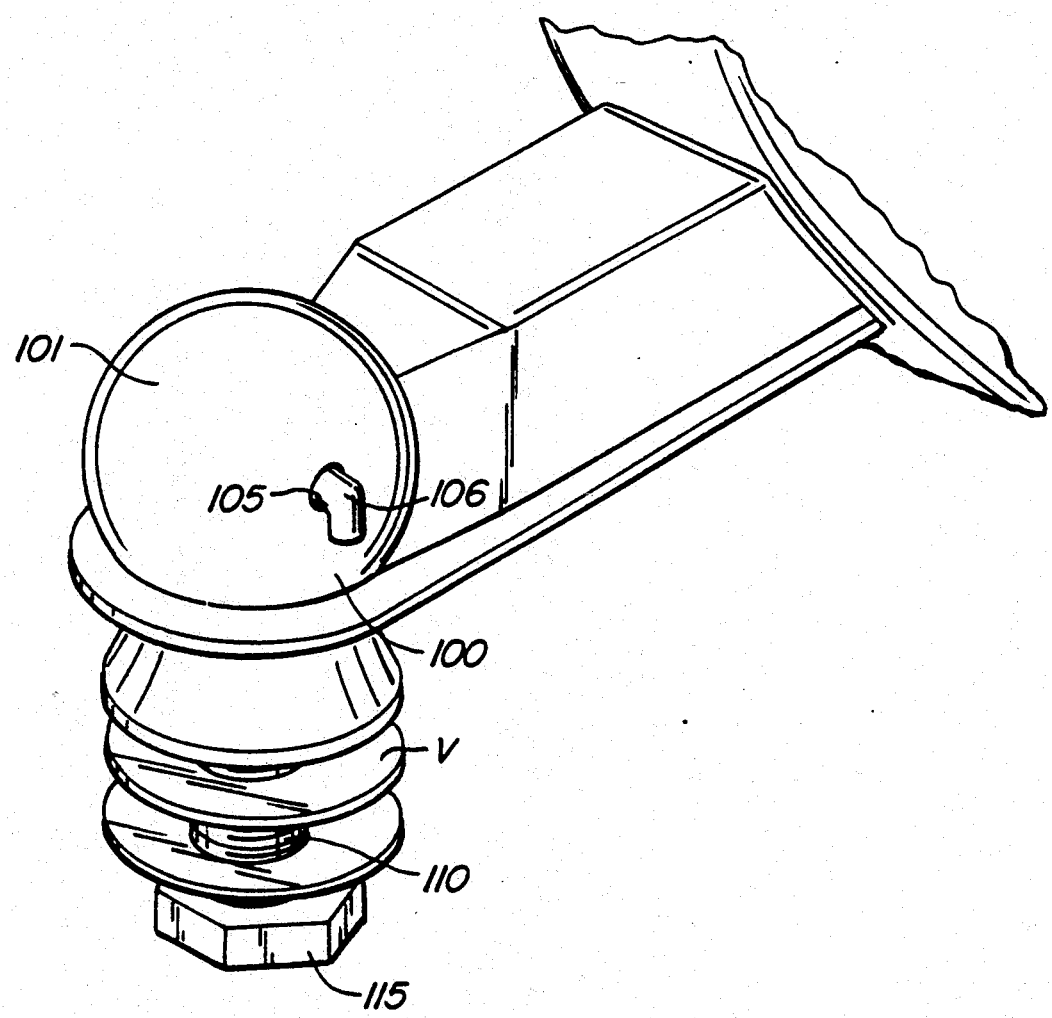
FIG. 7 is a detail of the trailer at the trailer ball for providing sideways stability to the trailer.

Referring to FIG. 7, a trailer ball 100 having a capturing female socket 101. Both ball 100 and socket 101 are cross bored at bore 105. This bore 105 has bolt 106 providing lateral stability to the trailer through ball 100 and socket 101.

The reader will understand that it is necessary that ball 100 be capable of turning with respect to its mount to the towing vehicle V. Thus ball 100 mounts through shaft 110 through two standard apertures in vehicle V at bolt 115. The ball is thus free to turn—but not tip with respect to vehicle V. It will be realized that this mount of ball 100 does not inhibit the use of ball 100 for regular towing where stability provided by bolt 106 is not required.

What is claimed is:

1. A collapsible ramp type motorcycle trailer for ramp on loading and off loading of a motorcycle comprising:

an axle having paired wheels mounted to opposite ends of said axle;

an axle ramp section for forming on one side of said axle ramp section a first portion of a trailer ramp and defining on an opposite side means for receiving said axle transversely disposed to said trailer ramp for rolling transport of said trailer on said wheels mounted to said axle;

a forward ramp portion hinged to said axle ramp section at a forward end for movement from a folded position confronted to said axle ramp section to a first locked position parallel to said axle ramp section to form a second section of said trailer ramp;

a wheel well portion hinged to said forward ramp portion at a rear end for movement from a position confronted to said forward ramp section to a second locked position substantially parallel to said axle ramp section and said forward ramp section in a first locked position to form a third and wheel receiving portion of said trailer ramp;

trailer hitch means attached to said wheel well portion for towing of said trailer on said wheels mounted to said axle; and, a rear ramp portion hinged to said axle ramp section for movement between a ground engaging position for forming a trailer ramp enabling rolling on loading and off loading of a motorcycle to said trailer, and forming an angled disposition with respect to said rear wheel of said motorcycle to enable tying of said trailer ramp to said motorcycle rear wheel at an elevated position of said rear wheel for braced transport of said motorcycle at said rear wheel, and a position confronted to said axle ramp section of said trailer ramp for collapse of said motorcycle trailer.

2. The invention of claim 1 and wherein said rear ramp portion defines means for providing a high friction surface to enable rolling transport of a motorcycle onto and off of said trailer.

3. The invention of claim 1 and wherein said axle has said wheels mounted eccentrically to a longitudinal axis of said axle; and, said means for receiving said axle defined in a lower portion of said axle ramp section braces said eccentrically mounted wheels with respect to said trailer ramp for shifting said wheels upwardly, downward, forwardly and rearward relative to said trailer ramp.

4. In combination;

a motorcycle having a front steering wheel and a rear driving wheel;

a trailer for towing said motorcycle including:

an axle having paired wheels mounted to opposite ends of said axle;

an axle ramp section for forming on one side of said axle ramp section a first portion of a trailer ramp and defining on an opposite side means for receiving said axle transversely disposed to said trailer ramp for rolling transport of said trailer on said wheels mounted to said axle;

a forward ramp portion hinged to said axle ramp section at the forward end for movement from a folded position confronted to said axle ramp section at one side to a first locked position parallel to said axle ramp section to form a second section of said trailer ramp;

a wheel well portion hinged to said forward ramp portion at a rear end for movement from a position confronted to said forward ramp portion to a second locked position substantially parallel to said axle ramp section and said forward ramp section in locked positions to form a third and wheel receiving portion of said trailer ramp;

trailer hitch means attached to said wheel well portion for towing of said trailer on said wheels mounted to said axle; and, a rear ramp portion hinged to said axle ramp section for movement between a ground engaging position for forming said trailer ramp enabling rolling on loading and off loading of a motorcycle to said trailer, and angled disposition with respect to said rear wheel of said motorcycle to enable tying of said trailer ramp to said motorcycle rear wheel at an elevated position of said rear wheel for braced transport of said motorcycle at said rear wheel, and a position confronted to said axle ramp section of said trailer ramp for collapse of said motorcycle trailer.

5. The invention of claim 4 and including:

a tie down bar mounted to said wheel well portion of said trailer ramp defining first and second tie downs spaced apart from said trailer ramp to enable said motorcycle to be secured to said trailer.

6. In combination;

a towing vehicle having a rearward disposed trailer attachment for mating towing engagement to a trailer;

a motorcycle having a front steering wheel and a rear driving wheel;

a trailer for towing said motorcycle including:

an axle having paired wheels mounted to opposite ends of said axle;

an axle ramp section for forming on one side of said axle ramp section a first portion of a trailer ramp and defining on an opposite side means for receiving said axle transversely disposed to said trailer ramp for rolling transport of said trailer on said wheels mounted to said axle;

a forward ramp portion hinged to said axle ramp portion at a forward end for movement from a folded position confronted to said axle ramp section to a first locked position parallel to said axle ramp section to form a second section of said trailer ramp;

a wheel well portion hinged to said forward ramp portion at the rear end for movement from a position confronted to said forward ramp portion to a second locked position substantially parallel to said axle ramp section and said forward ramp portion to form a third and wheel receiving portion of said trailer ramp;

trailer hitch means attached to said wheel well portion for towing of said trailer on said wheels mounted to said axle; and, a rear ramp portion hinged to said axle ramp section for movement between a ground engaging position for forming said ramp enabling rolling on loading and off loading of said motorcycle to said trailer at an angled disposition with respect to said rear wheel of said motorcycle to enable tying of said trailer ramp to said motorcycle rear wheel at an elevated position of said rear wheel for braced transport of said motorcycle at said rear wheel, and a position confronted to said axle portion of said trailer ramp for collapse of said motorcycle trailer.

7. The invention of claim 6 and wherein said towing vehicle defines two side-by-side spaced apart towing points;

two trailers mounted side-by-side for towing from said towing points; and, a spacer bar pivoted from and mounted to each said trailer at a point remote from said towing points for pulling said trailers in spaced apart relation.

8. The invention of claim 1 and wherein said trailer hitch means includes:

a ball mounted on said towing vehicle, said ball mounted for rotation about a vertical axis with respect to said towing vehicle;

a socket mounted to said trailer for mating with said ball;

a cross bore defined through both said ball and said socket substantially normal to the turning axis of said ball; and, a bolt extending through said bore for providing to said trailer through said ball transverse stability to said trailer.

* * * * *